United States Patent
Nejedly et al.

(10) Patent No.: US 11,624,375 B2
(45) Date of Patent: Apr. 11, 2023

(54) MOISTURE REMOVAL SYSTEM FOR ELECTRIC COMPRESSOR DEVICE

(71) Applicant: Garrett Transportation I Inc, Torrance, CA (US)

(72) Inventors: Milan Nejedly, Brno (CZ); Daniel Turecek, Ostopovice (CZ); Vit Houst, Sestajovice (CZ)

(73) Assignee: GARRETT TRANSPORTATION I INC, Torrance, CA (US)

( * ) Notice: Subject to any disclaimer, the term of this patent is extended or adjusted under 35 U.S.C. 154(b) by 0 days.

(21) Appl. No.: 17/147,671

(22) Filed: Jan. 13, 2021

(65) Prior Publication Data

US 2022/0220981 A1 Jul. 14, 2022

(51) Int. Cl.
| | |
|---|---|
| F04D 29/70 | (2006.01) |
| F04D 17/10 | (2006.01) |
| F04D 25/06 | (2006.01) |
| F04D 29/056 | (2006.01) |
| F04D 29/059 | (2006.01) |
| F04D 29/10 | (2006.01) |

(52) U.S. Cl.
CPC ........... *F04D 29/706* (2013.01); *F04D 17/10* (2013.01); *F04D 25/06* (2013.01); *F04D 29/056* (2013.01); *F04D 25/0606* (2013.01); *F04D 29/059* (2013.01); *F04D 29/102* (2013.01)

(58) Field of Classification Search
CPC ...... F04D 29/056; F04D 29/706; F04D 17/10; F04D 25/06; F04D 25/0606; F04D 29/059; F04D 29/102
See application file for complete search history.

(56) References Cited

U.S. PATENT DOCUMENTS 3,658,442 A * 4/1972 Heitmann ............. F04D 25/163
  415/230
9,890,691 B2 * 2/2018 Banker ............... F02D 41/0007
(Continued)

FOREIGN PATENT DOCUMENTS

JP 2003097487 A * 4/2003
WO 2014210093 A1 12/2014
(Continued)

OTHER PUBLICATIONS

English Machine Translation of JP-2003097487-A (Year: 2003).*

*Primary Examiner* — Nathan C Zollinger
(74) *Attorney, Agent, or Firm* — Lorenz & Kopf, LLP

(57) ABSTRACT

A compressor device includes a housing and a rotating group with a shaft and a compressor wheel supported on the shaft. The compressor wheel includes a back face. The compressor device further includes a bearing that supports the rotating group within the housing for rotation about an axis. Also, the compressor device includes a spacer that is disposed longitudinally along the axis between the back face of the compressor wheel and the bearing. The spacer is received within a wall of the housing. Moreover, the compressor device includes a moisture removal system configured to receive and remove moisture included within a fluid flow from the back face of the compressor wheel to an area between the spacer and the wall of the housing. The moisture removal system includes a channel cooperatively defined by the spacer and the wall of the housing. The channel extends about the axis.

20 Claims, 4 Drawing Sheets

(56) References Cited

U.S. PATENT DOCUMENTS

| | | | |
|---|---|---|---|
| 9,970,450 B1 | 5/2018 | Kelly | |
| 10,473,110 B2 * | 11/2019 | Iizuka | F04D 29/4206 |
| 2013/0152357 A1 * | 6/2013 | Scotti Del Greco | F04B 51/00 |
| | | | 29/407.01 |
| 2015/0226467 A1 * | 8/2015 | Sommer | F16C 37/005 |
| | | | 62/505 |
| 2019/0010947 A1 * | 1/2019 | Mei | F04D 29/706 |
| 2021/0102551 A1 * | 4/2021 | Iizuka | F04D 17/10 |

FOREIGN PATENT DOCUMENTS

| | | | |
|---|---|---|---|
| WO | WO-2015132502 A1 * | 9/2015 | F16J 15/3484 |
| WO | WO-2017055717 A1 * | 4/2017 | |
| WO | 2017203178 A2 | 11/2017 | |

* cited by examiner

MOISTURE REMOVAL SYSTEM FOR ELECTRIC COMPRESSOR DEVICE

TECHNICAL FIELD

The present disclosure generally relates to a compressor device and, more particularly, relates to a moisture removal system for an electric compressor device.

BACKGROUND

Various systems include a compressor device for supplying compressed fluid to a device. For example, engine systems can include at least one compressor device (e.g., an electric compressor, turbocharger, supercharger, or other related device) for compressing air that is fed to the engine. Fuel cell systems may also include one or more compressor devices for providing compressed air to a fuel cell stack. The compressor device can increase operating efficiency of these systems.

However, moisture in the fluid stream that is inlet into the compressor may detrimentally affect the compressor device. For example, in some embodiments, the compressor device may include an electric motor, and the moisture inlet into the compressor device may negatively affect the motor, the electronic control components for the motor, etc.

Thus, it is desirable to provide a compressor device that efficiently and effectively removes moisture flowing therethrough. Other desirable features and characteristics of the present disclosure will become apparent from the subsequent detailed description and the appended claims, taken in conjunction with the accompanying drawings and this background discussion.

BRIEF SUMMARY

In one embodiment, a compressor device is disclosed that includes a housing and a rotating group with a shaft and a compressor wheel supported on the shaft. The compressor wheel includes a back face. The compressor device further includes a bearing that supports the rotating group within the housing for rotation about an axis. Also, the compressor device includes a spacer that is disposed longitudinally along the axis between the back face of the compressor wheel and the bearing. The spacer is received within a wall of the housing. Moreover, the compressor device includes a moisture removal system configured to receive and remove moisture included within a fluid flow from the back face of the compressor wheel to an area between the spacer and the wall of the housing. The moisture removal system includes a channel cooperatively defined by the spacer and the wall of the housing. The channel extends about the axis.

In another embodiment, a method of manufacturing a compressor device is disclosed. The method includes providing a rotating group with a shaft and a compressor wheel supported on the shaft. The compressor wheel includes a back face. The method also includes supporting, with a bearing, the rotating group within a housing for rotation about an axis. Furthermore, the method includes disposing a spacer longitudinally along the axis between the back face of the compressor wheel and the bearing such that the spacer is received within a wall of the housing. Also, the method includes defining at least part of a moisture removal system that is configured to receive and remove moisture included within a fluid flow from the back face of the compressor wheel to an area between the spacer and the wall of the housing, wherein the moisture removal system includes a channel cooperatively defined by the spacer and the wall of the housing, and wherein the channel extends about the axis.

In an additional embodiment, a fluid system is disclosed that that is configured to compress a fluid supplied to a receiving device. The fluid system includes an upstream compressor device and a downstream compressor device. The fluid system also includes a valve having a first position and a second position. The fluid system with the valve in the first position provides a first flow path from the upstream compressor device to the downstream compressor device and then to the receiving device. The fluid system with the valve in the second position provides a second flow path from the upstream compressor device to the receiving device and that bypasses the downstream compressor device. The downstream compressor device includes a housing and a rotating group with a shaft and a compressor wheel supported on the shaft, wherein the compressor wheel includes a back face. Furthermore, the downstream compressor device includes a bearing that supports the rotating group within the housing for rotation about an axis. The downstream compressor device also includes a spacer that is disposed longitudinally along the axis between the back face of the compressor wheel and the bearing, wherein the spacer is received within a wall of the housing. Moreover, the downstream compressor device includes a moisture removal system configured to receive and remove moisture included within a fluid flow from the back face of the compressor wheel to an area between the spacer and the wall of the housing. The moisture removal system includes a channel cooperatively defined by the spacer and the wall of the housing, wherein the channel extends about the axis.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a compressor device for a fluid system. The compressor device may include a moisture removal system configured to receive and remove moisture within an airstream that moves through the compressor device. In some embodiments, the compressor device may be a motorized e-compressor. The moisture removal system may route moisture away from an electric motor and/or electronic controls of the motorized e-compressor device. Accordingly, the moisture removal system protects moisture-sensitive components and increases the operating lifetime of the compressor device.

Methods of manufacturing the compressor device and manufacturing systems for the compressor device are also disclosed herein. Furthermore, embodiments of the present disclosure include fluid systems, compressor systems, engine systems, fuel cell systems, and other systems that incorporate a compressor device with a moisture removal system.

In some embodiments, the moisture removal system may include an internal channel for receiving moisture within an airflow through the compressor device. The channel may be defined by a spacer and/or a housing of the compressor device. In some embodiments, the spacer may include a groove that cooperates with the housing to define the channel. In additional embodiments, the housing may include a groove that cooperates with the spacer to define the channel.

The channel may extend at least partly about an axis of rotation of the rotating group of the compressor device. The channel may be arcuate. The channel may be annular. The channel may extend continuously about the axis. The moisture removal system may also include a drain line that extends through the housing of the compressor device and that is fluidly connected to the channel.

The moisture removal system may effectively remove moisture from airflow through the compressor device without negatively affecting operation. Also, the moisture removal system of the present disclosure may be incorporated without significantly increasing manufacturing costs or complexity.

Figure 1:
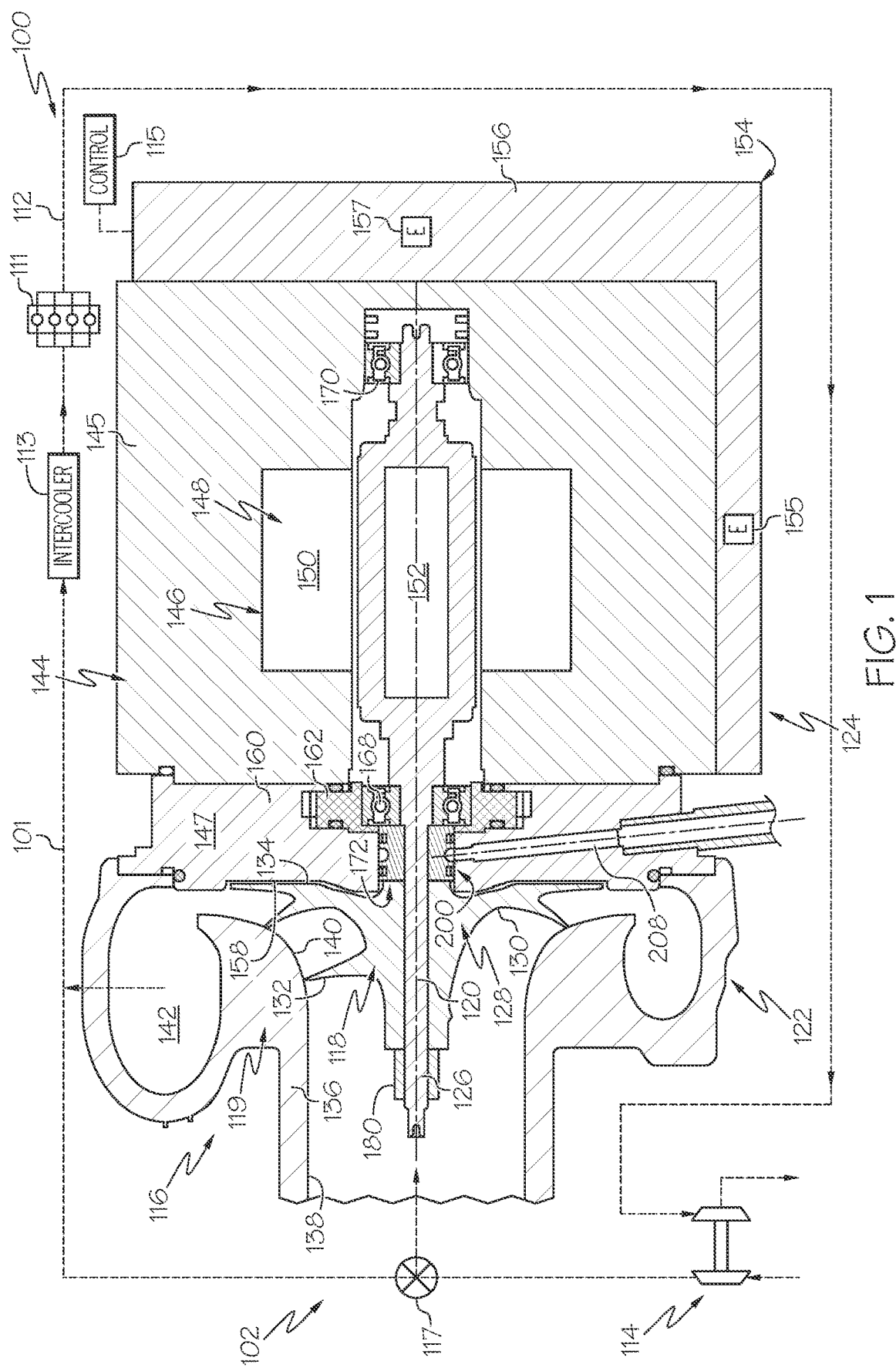
FIG. 1 is a schematic illustration of an engine system with an electric compressor device according to example embodiments of the present disclosure.

FIG. 1 is a schematic view of an engine system 100 with an associated fluid system 102 (i.e., an air intake and exhaust system). The fluid system 102 is configured to provide a compressed airstream (represented by arrow 101) to an internal combustion engine 111 (i.e., a receiving device) as will be discussed. The engine 111 may also provide an exhaust stream (represented by arrow 112) back to the fluid system 102.

In some embodiments, the engine system 100 and the fluid system 102 may be included in a vehicle, such as a car, truck, sport utility vehicle, van, motorcycle, etc. However, it will be appreciated that the engine system 100 and/or fluid system 102 may be configured for a different use without departing from the scope of the present disclosure. It will also be appreciated that the fluid system 102 may be adapted for a device other than an internal combustion engine. For example, the fluid system 102 may be operably coupled to a fuel cell stack for providing a compressed airstream thereto.

The fluid system 102 may include at least one boosting device, such as a compressor, turbocharger, supercharger, e-charger, etc., configured to provide the compressed airstream 101. In some embodiments, for example, the fluid system 102 may include a first (upstream) compressor device 114 and a second (downstream) compressor device 116. As represented in FIG. 1, the first compressor device 114 may be configured as a turbocharger, and the second compressor device 116 may be configured as an electric compressor device (i.e., electric supercharger, etc.). However, the first and/or second compressor devices 114, 116 may be configured differently without departing from the scope of the present disclosure.

The fluid system 102 may also include a valve 117. The valve 117 may be disposed between the compressor sections of the compressor devices 114, 116. More specifically, the valve 117 may be disposed between the outlet of the compressor section of the first compressor device 114 and the inlet of the second compressor device 116. The valve 117 may be moveable between a first position and a second position. In the first position (open position), the first and second compressor devices 114, 116 may be arranged in-series such that a first flow path is defined from the first compressor device 114, through the second compressor device 116, and then to the internal combustion engine 111. In the second position (closed position), the valve 117 may provide a second flow path from the first compressor device 114 to the internal combustion engine 111, bypassing the second compressor device 116.

The fluid system 102 may further include an intercooler 113. The intercooler 113 may be arranged upstream of the internal combustion engine 111 and may cool the compressed airstream 101 before it is received by the engine 111.

Various components of the engine system 100, the fluid system 102, the first compressor device 114, the second compressor device 116, and/or the valve 117 may be controlled by a control system 115. The control system 115 may be a computerized system with a processor, various sensors, and other control components. In some embodiments, the control system 115 may define or may be part of the electrical control unit (ECU) of a vehicle. The control system 115 may control the position of the valve 117 based on a variety of factors, such as engine speed of the engine 111.

During operation of the engine system 100, the control system 115 may move the valve 117 to the first position. Also, the compressor section of the first compressor device 114 may receive and compress air that is routed through the valve 117 to the second compressor device 116, which further compresses the airstream. This compressed airstream 101 may be supplied to the intercooler 113, which cools the airstream 101 before it is supplied to the engine 111. The fluid system 102 also routes the exhaust gas stream 112 of the engine 111 back to the turbine section of the first compressor device 114 for driving rotation thereof.

In other operating conditions, the control system 115 may move the valve 117 to the second position. Also, the compressor section of the first compressor device 114 may receive and compress air that is routed through the valve 117 to the intercooler 113 and further downstream to the engine 111. This compressed airstream 101 bypasses the second compressor device 116. Furthermore, the exhaust gas stream 112 is returned back to the turbine section of the first compressor device 114.

The airstream that is received by the second compressor device 116 may have significant moisture content (i.e., high humidity). When the valve 117 is in the first position, a relatively large volume of high-humidity air may move through the second compressor device 116. Also, with the valve 117 moving between the first and second positions, static pressure within the second compressor device 116 may provide some of this high-humidity air thereto. However, as will be discussed, the second compressor device 116 may include one or more features that receives, manages, and removes this moisture for protecting other components of the device 116 (e.g., electronic equipment, etc.).

Figure 2:
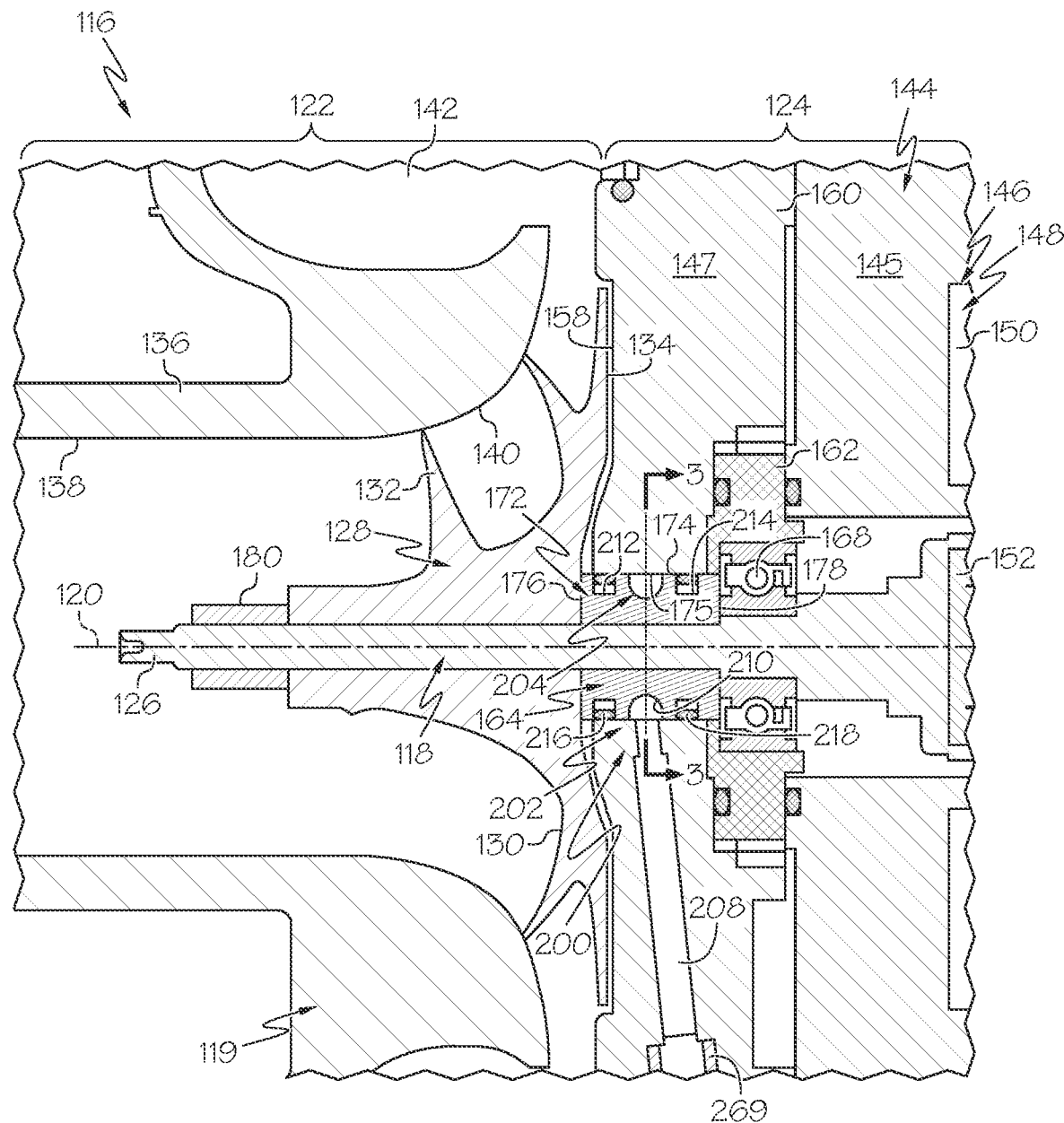
FIG. 2 is a longitudinal cross-sectional view of part of the electric compressor device of FIG. 1 according to example embodiments of the present disclosure.
Figure 3:
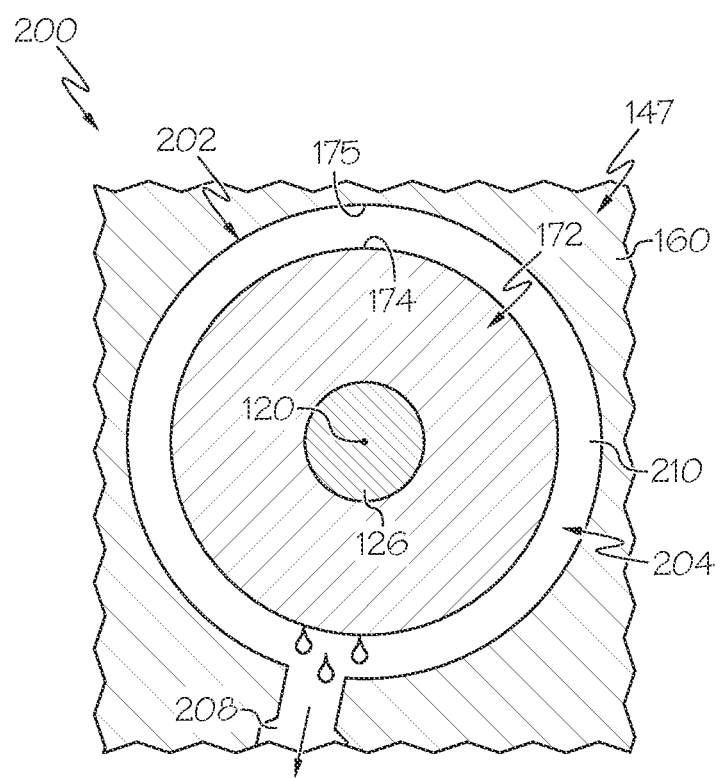
FIG. 3 is a cross-sectional view of the electric compressor device of FIG. 2 taken along the line 3-3.

Referring now to FIGS. 1-3, the second compressor device 116 will be discussed in greater detail according to example embodiments. The compressor device 116 may generally include a rotating group 118 and a housing 119. The rotating group 118 is supported for rotation about an axis 120 within the housing 119. Also, in some embodiments, the compressor device 116 may define a compressor section 122 and a motor section 124.

The rotating group 118 may include an elongate shaft 126 that extends along the axis 120 between the compressor section 122 and the motor section 124. The shaft 126 may be centered on the axis 120.

The rotating group 118 may also include a compressor wheel 128. The compressor wheel 128 may have a front face 130 that is generally frusto-conic and that includes a plurality of blades 132 that project therefrom. The blades 132 may also extend helically about the axis 120 along the front face 130. The compressor wheel 128 may also have a back face 134 that is substantially flat and smooth and that extends radially with respect to the axis 120. The compressor wheel 128 may be fixed on one end of the shaft 126.

The compressor wheel 128 may be supported within a compressor housing 136 of the housing 119. The compressor housing 136 may include a hollow, tubular inlet 138, a contoured internal surface 140, and a volute or scroll-shaped outlet 142. The inlet 138 may be centered and directed along the axis 120. The outlet 142 may extend about the axis 120. The internal surface 140 may be gradually contoured between the inlet 138 and the outlet 142. The compressor wheel 128 may be received within the compressor housing 136 with the front face 130 and blades 132 opposing the internal surface 140. Accordingly, the compressor wheel 128 and the compressor housing 136 may cooperatively define the compressor section 122 of the compressor device 116.

The housing 119 may also include a motor housing 144. The motor housing 144 may include one or more strong and robust parts that define a motor cavity 146 therein. As shown in FIG. 1, the motor housing 144 may include an outer housing 145 and an end wall 147, which cooperatively define the motor cavity 146.

The compressor device 116 may further include an electric motor 148 that is housed within the motor cavity 146 of the motor housing 144. The electric motor 148 may include a stator 150 that is surrounded by the outer housing 145. The axial end of the stator 150 may be covered over by the end wall 147 of the housing 144. The electric motor 148 may also include a rotor member 152, which is supported on the shaft 126 of the rotating group 118. The motor 148 may selectively drive rotation of the rotating group 118.

Additionally, the compressor device 116 may include at least one control panel 154 (FIG. 1) that is mounted on and supported by the housing 119. The control panel(s) 154 may include electronic components for control of the electric motor 148. In some embodiments, the control panel 154 may include one or more circuit board assemblies that are housed within a control housing 156. The control housing 156 may be fixed to the motor housing 144. For example, as represented in FIG. 1, the control housing 156 may include portions that are fixed to the longitudinal end of the compressor device 116 (on the longitudinal end opposite the compressor section 122). Also, as represented in the example of FIG. 1, the control housing 156 may include portions that are fixed to the radial side of the motor housing 144. The control panel 154 may also include first electronic components 155 (e.g., one or more circuit board assemblies, etc.) disposed on the radial side and/or second electronic components 157 disposed on the longitudinal end of the compressor device 116. The electronic components 155, 157 may be in communication with the control system 115 of the system 100. Accordingly, the control system 115 may control speed, acceleration, and other operating conditions of the motor 148 for selectively controlling operations of the system 100.

In the compressor section 122, the shaft 126 may extend through the end wall 147. The compressor housing 136 may be fixedly attached to the end wall 147 to cover over the front face 130 of the compressor wheel 128. The back face 134 of the compressor wheel 128 may face toward a radially-extending surface 158 of the end wall 147 of the housing 119. Accordingly, the end wall 147 may be longitudinally disposed between the back face 134 of the compressor wheel 128 and the stator 150 of the motor 148. In other words, the end wall 147 may separate the back face 134 of the compressor wheel 128 from the stator 150 of the motor 148.

In some embodiments, the end wall 147 may be cooperatively defined by a plurality of parts. For example, the end wall 147 may include a cap member 160 and an inner ring 162. Both the cap member 160 and the ring 162 may be generally annular in shape. The cap member 160 and ring 162 may cooperatively define a central opening 164 of the end wall 147 through which the shaft 126 extends. The cap member 160 may be fixed on one side to the outer housing 145 and fixed on the opposite side to the compressor housing 136. The inner ring 162 may be fixed and received within an inner radial area of the cap member 160 on the side facing the motor 148.

The compressor device 116 may additionally include one or more bearings 168, 170. The bearing(s) 168, 170 may be roller element bearings as represented in FIG. 1. However, it will be appreciated that the compressor device 116 may include air bearings or other types of bearings without departing from the scope of the present disclosure.

In some embodiments, the compressor device 116 may include a first bearing 168 (i.e., a front bearing), which is received within the central opening 164. More specifically, an outer radial portion (e.g., an outer race) of the first bearing 168 may be attached to the inner ring 162 of the end wall 147, and the inner radial portion (e.g., an inner race) may be attached to the shaft 126.

As shown in FIG. 1, the compressor device 116 may also include a second bearing 170 (i.e., a rear bearing). The second bearing 170 may be coupled to the shaft 126 on the end of the shaft 126 that is proximate the control panel 154. More specifically, an outer radial portion (e.g., an outer race) of the second bearing 170 may be attached to the housing 119, and the inner radial portion (e.g., an inner race) may be attached to the shaft 126.

As shown in FIGS. 1 and 2, the compressor device 116 may further include a spacer 172. The spacer 172 may be generally annular, spool-shaped, tubular, cylindrical, etc. The spacer 172 may include an outer radial surface 174, a first longitudinal end 176, and a second longitudinal end 178 (FIG. 2). The spacer 172 may be received within the central opening 164 with the outer radial surface 174 facing an inner radial surface 175 of the cap member 160 of the end wall 147. The first longitudinal end 176 may abut against the hub area of the back face 134 of the compressor wheel 128. The second longitudinal end 178 may abut against the inner race of the first bearing 168. The rotating group 118 may also include an end fastener 180 that is attached to the shaft 126 and that fixedly attaches the components of the rotating group 118 on the shaft 126. The spacer 172 maintains longitudinal spacing between the compressor wheel 128 and the bearing 168 in this assembled arrangement.

Moreover, the compressor device 116 may include a moisture removal system 200. The moisture removal system 200 may be configured for receiving moisture contained within the airflow through the compressor device 116. The moisture removal system 200 may also remove (e.g., drain) the moisture from the compressor device 116. For example, the compressor device 116 may receive relatively humid air from the compressor device 114 (FIG. 1). The moisture removal system 200 may remove the moisture, for example, from a flow of air that bleeds between the back face 134 of the compressor wheel 128 to an area 202 between the spacer 172 and the end wall 147.

In some embodiments, the moisture removal system 200 may generally include a channel 204 and a drain line 208. The channel 204 may be defined proximate the area 202 and/or may define part of the area 202. The volumetric space defined by the channel 204 may be useful for receiving moisture within the airflow passing through the area 202. The drain line 208 may extend through the housing 119 and may be fluidly connected on one end to the channel 204. Accordingly, as represented in FIG. 3, moisture collected within the channel 204 may drain out of the compressor device 116 via the drain line 208.

Furthermore, in some embodiments represented in FIG. 2, the outer radial surface 174 of the spacer 172 may include a groove 210. The groove 210 may be recessed into the outer radial surface 174. The groove 210 may have a contoured (e.g., U-shaped) radial cross section as shown in FIG. 2. However, it will be appreciated that the groove 210 may have a different cross section without departing from the scope of the present disclosure. The groove 210 may extend arcuately along the outer radial surface 174 of the spacer 172. In some embodiments, the groove 210 may extend continuously about the axis 120. The radial cross section (e.g., the U-shaped profile shown in FIG. 2) may remain substantially continuous as the groove 210 extends about the axis 120. Also, the groove 210 may define a circle that is centered on the axis 120 and that is normal thereto.

The spacer 172 may also include a first notch 212 and a second notch 214 (FIG. 2), which are recessed into the outer radial surface 174. The first and second notches 212, 214 may be continuous and annular so as to extend about the axis 120. The first and second notches 212, 214 may be disposed on opposite axial sides of the groove 210. The first and second notches 212, 214 may receive respective sealing rings 216, 218, which may be off-the-shelf sealing parts. Accordingly, the sealing rings 216, 218 may be attached to the spacer 172 and disposed on opposite sides of the groove 210 with respect to the axis 120.

The spacer 172 may be received within the central opening 164 of the end wall 147 such that the sealing rings 216, 218 seal against the inner radial surface 175. Also, the groove 210 may cooperate with the inner radial surface 175 to define the channel 204 of the moisture removal system 200. Accordingly, the channel 204 may extend arcuately, annularly, and continuously about the axis 120 with the cross section represented in FIG. 2 remaining substantially constant as the channel 204 extends about the axis 120. Again, however, it will be appreciated that the groove 210 may shaped and/or otherwise configured without departing from the scope of the present disclosure.

The drain line 208 may be axially straight and may extend radially away from the axis 120 through the end wall 147 of the housing 119. The drain line 208 may be fluidly connected to the channel 204. The diameter of the drain line 208 may change as the drain line 208 extends away from the channel 204. In some embodiments, the drain line 208 may include a membrane 269 for controlling moisture drainage from the line 208.

Accordingly, during operation of the compressor device 116, some air may flow from between the back face 134 of the compressor wheel 128 and the end wall 147. This air may flow through the area 202, past the first sealing ring 216 and into the channel 204. Moisture within this airflow may be collected within the channel 204 as the air flows further and passes the second sealing ring 218, through the bearing 168, toward the rotor member 152 of the motor 148, and further into the motor section 124. Moisture within the channel 204 may drain from the compressor device 116 via the drain line 208 instead of passing into the motor section 124. Accordingly, the moisture removal system 200 may protect the motor 148, the electronic components 155, 157, etc. from moisture exposure and extend the operating lifetime of the compressor device 116.

The compressor device 116 may be manufactured efficiently and at low cost. The rotating group 118 may be provided and assembled and supported within the housing 119. The spacer 172 may be provided within the housing 119, and the channel 204 may be fluidly connected to the drain line 208 during such assembly. Thus, assembly and further manufacture can be completed in a highly efficient manner.

Figure 4:
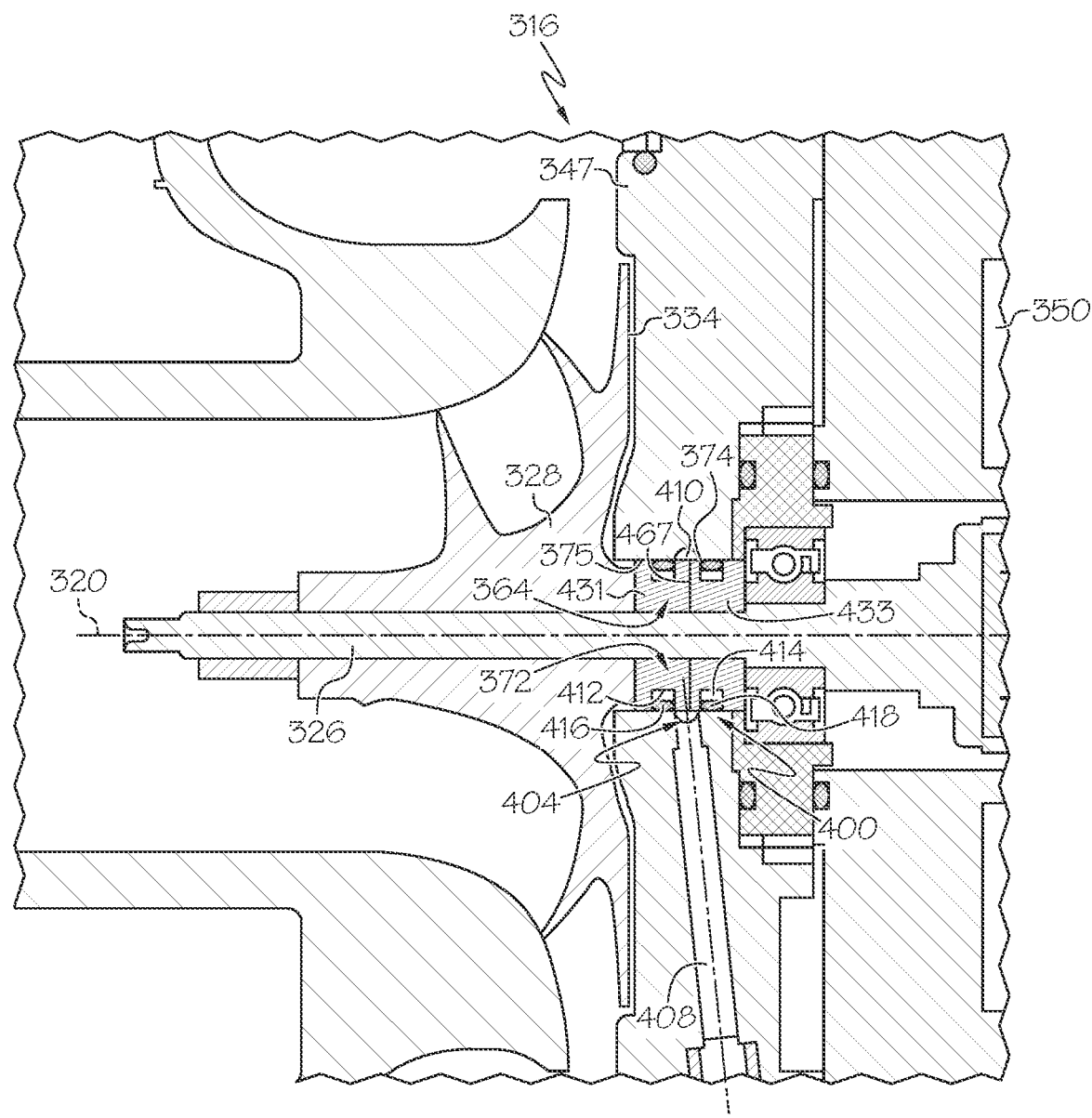
FIG. 4 is a longitudinal cross-sectional view of part of the electric compressor device of FIG. 1 according to additional example embodiments of the present disclosure.

Referring now to FIG. 4, the compressor device 316 will be illustrated according to additional embodiments of the present disclosure. The compressor device 316 may be substantially similar to the compressor device 116 of FIGS. 1-3 except as noted. Thus, descriptions of some components/features will not be repeated. Components/features that correspond to those of FIGS. 1-3 are indicated with corresponding reference numbers increased by 200.

As shown, the end wall 347 may include the groove 410. The groove 410 may be recessed into the inner radial surface 375 of the end wall 347. The groove 410 may extend annularly and continuously along the inner radial surface 375 of the end wall 347.

The spacer 372 may be received within the end wall 347 such that the groove 410 cooperates with the outer radial surface 374 to define the channel 404 of the moisture removal system 400. Accordingly, the channel 404 may extend arcuately, annularly, and continuously about the axis 320.

The spacer 372 may also include the first notch 412 and the second notch 414, which receive the respective sealing rings 416, 418. Furthermore, as shown in FIG. 4, the spacer 372 may be collectively defined by a first part 431 and a second part 433. The first and second parts 431, 433 may be spool-shaped and centered on the axis 320. The parts 431, 433 may be arranged longitudinally end-to-end to abut at a parting plane 467. The first part 431 may include the first notch 412 and the first sealing ring 416, whereas the second part 433 may include the second notch 414 and the second sealing member 418. Thus, the sealing rings 416, 418 may be attached to the respective parts 431, 433 of the spacer 372 and disposed on opposite sides of the channel 404 with respect to the axis 320.

Because the spacer 372 includes the first and second parts 431, 433, assembly of the compressor device 316 may be facilitated. For example, during assembly the second part 433 may be provided in position on the shaft 326, and then the end wall 347 may be advanced axially over the second part 433 and toward the stator 350. Subsequently, the first part 431 may be advanced axially into the central opening 364 of the end wall 347 before attachment of the compressor wheel 328, and so on.

Thus, like the embodiments of FIGS. 1-3, the moisture removal system 400 may remove moisture from the compressor device 316. Accordingly, the moisture removal system 200, 400 of the present disclosure may protect sensitive components. Also, the moisture removal system 200, 400 of the present disclosure can be included without significantly increasing manufacturing time or costs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A compressor device comprising:
a housing;
a rotating group with a shaft and a compressor wheel supported on the shaft, the compressor wheel including a back face;
a bearing that supports the rotating group within the housing for rotation about an axis;
a spacer of the rotating group that is disposed on the shaft longitudinally along the axis between the back face of the compressor wheel and the bearing, the spacer abutting the compressor wheel and the bearing to maintain spacing along the axis between the compressor wheel and the bearing, the spacer received within a wall of the housing; and
a moisture removal system configured to receive and remove moisture included within a fluid flow from the back face of the compressor wheel to an area between the spacer and the wall of the housing, the moisture removal system including a channel cooperatively defined by the spacer and the wall of the housing, the channel extending about the axis.

2. The compressor device of claim 1, further comprising an electric motor; and
wherein the wall of the housing separates the back face of the compressor wheel from the electric motor.

3. The compressor device of claim 1, wherein the channel extends arcuately about the axis.

4. The compressor device of claim 3, wherein the channel extends annularly about the axis.

5. The compressor device of claim 4, wherein the channel has a radial cross-section that remains substantially continuous as the channel extends about the axis.

6. The compressor device of claim 5, wherein the radial-cross section is U-shaped.

7. The compressor device of claim 3, further comprising a drain line extending through the wall of the housing, the drain line fluidly connected to the channel.

8. The compressor device of claim 1, wherein the spacer includes a groove on an outer radial area thereof and that cooperates with an inner radial surface of the wall to define the channel.

9. The compressor device of claim 8, further comprising a first seal ring and a second seal ring that are attached to the spacer and that are disposed on opposite sides of the groove with respect to the axis.

10. The compressor device of claim 1, wherein the wall includes a groove on an inner radial area thereof and that cooperates with an outer radial surface of the spacer to define the channel.

11. The compressor device of claim 10, further comprising a first seal ring and a second seal ring that are attached to the spacer and that are disposed on opposite sides of the groove with respect to the axis.

12. The compressor device of claim 11, wherein the spacer includes a first part and a second part, the first seal ring is attached to the first part, and the second seal ring is attached to the second part.

13. The compressor device of claim 1, wherein the bearing is a rolling element bearing with an inner race that is attached to the shaft, the spacer disposed on the shaft and abutting the inner race to maintain spacing along the axis between the compressor wheel and the inner race of the bearing.

14. A method of manufacturing a compressor device comprising:
providing a rotating group with a shaft and a compressor wheel supported on the shaft, the compressor wheel including a back face;
supporting, with a bearing, the rotating group within a housing for rotation about an axis;
disposing a spacer of the rotating group on the shaft longitudinally along the axis between the back face of the compressor wheel and the bearing, the spacer abutting the compressor wheel and the bearing to maintain spacing along the axis between the compressor wheel and the bearing, the spacer received within a wall of the housing; and
defining at least part of a moisture removal system that is configured to receive and remove moisture included within a fluid flow from the back face of the compressor wheel to an area between the spacer and the wall of the housing, the moisture removal system including a channel cooperatively defined by the spacer and the wall of the housing, the channel extending about the axis.

15. The method of claim 14, further comprising housing an electric motor within the housing;
wherein supporting the rotating group within the housing includes separating the back face of the compressor wheel from the electric motor with the wall.

16. The method of claim 14, wherein the channel extends arcuately about the axis.

17. The method of claim 16, further comprising providing a drain line that extends through the wall of the housing, the drain line fluidly connected to the moisture channel.

18. The method of claim 14, wherein the spacer includes a groove on an outer radial area thereof that cooperates with an inner radial surface of the wall to define the channel.

19. The method of claim 14, wherein the wall includes a groove on an inner radial area thereof that cooperates with an outer radial surface of the spacer to define the channel.

20. A fluid system configured to compress a fluid supplied to a receiving device comprising:
an upstream compressor device;
a downstream compressor device;
a valve having a first position and a second position, the fluid system with the valve in the first position providing a first flow path from the upstream compressor device to the downstream compressor device and then to the receiving device, the fluid system with the valve in the second position providing a second flow path from the upstream compressor device to the receiving device that bypasses the downstream compressor device;
the downstream compressor device comprising:
a housing;

a rotating group with a shaft and a compressor wheel supported on the shaft, the compressor wheel including a back face;

a rolling element bearing with an inner race that is attached to the shaft, the rolling element bearing supporting the rotating group within the housing for rotation about an axis;

a spacer of the rotating group that is attached to the shaft and that is disposed longitudinally along the axis between the back face of the compressor wheel and the bearing, the spacer abutting the compressor wheel and the bearing to maintain spacing along the axis between the compressor wheel and the bearing, the spacer received within a wall of the housing; and a moisture removal system configured to receive and remove moisture included within a fluid flow from the back face of the compressor wheel to an area between the spacer and the wall of the housing, the moisture removal system including a channel cooperatively defined by the spacer and the wall of the housing, the channel extending about the axis.

* * * * *